Aug. 11, 1931.  E. McCUTCHEON  1,818,732
CAN COVER REMOVER
Filed Jan. 29, 1930
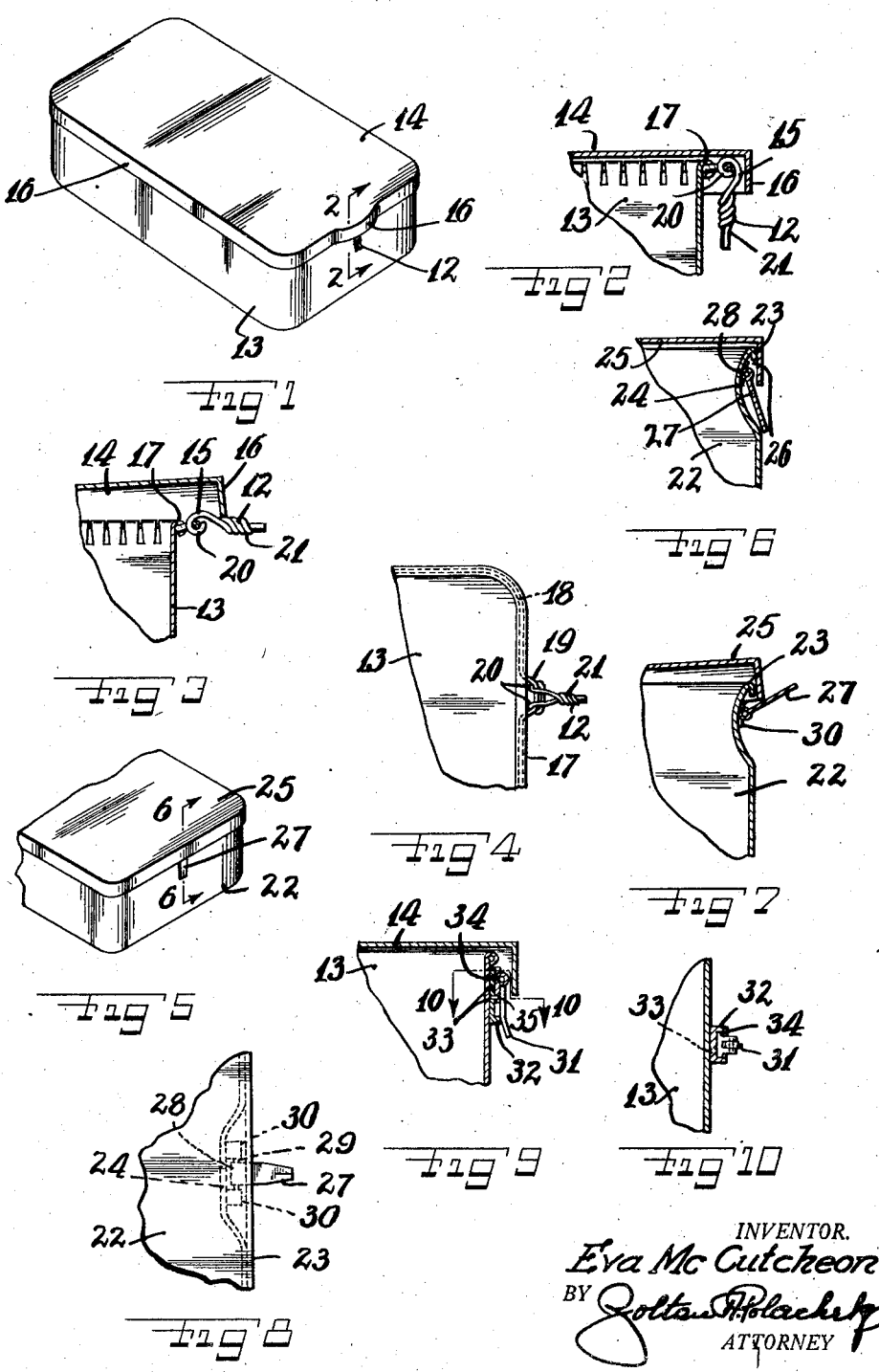
INVENTOR.
Eva Mc Cutcheon
BY
ATTORNEY Patented Aug. 11, 1931

1,818,732

UNITED STATES PATENT OFFICE

EVA McCUTCHEON, OF BROOKLYN, NEW YORK

CAN COVER REMOVER

Application filed January 29, 1930. Serial No. 424,150.

This invention relates to new and useful improvements in a can cover remover.

The invention has for an object the provision of a device of the class mentioned which is of simple durable construction, dependable in use and efficient in action, and which can be manufactured and sold at a reasonable cost.

The invention proposes a prying member movably mounted upon the outer side of a container having a cover and positioned with a portion extended beneath an edge of said cover and adapted upon being manually moved to pry the cover off from the container.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a container with a cover provided with a cover remover constructed according to this invention.

Fig. 2 is an enlarged detailed fragmentary sectional view taken on the line 2—2 of Fig. 1.

Fig. 3 is a view similar to Fig. 2, but showing the cover in pried off position.

Fig. 4 is a plan view of the container as seen in Fig. 3.

Fig. 5 is a fragmentary perspective view similar to a portion of Fig. 1, but illustrating another embodiment of the invention.

Fig. 6 is a fragmentary vertical sectional view taken on the line 6—6 of Fig. 5.

Fig. 7 is a view similar to Fig. 6, but showing the cover in pried off position.

Fig. 8 is a plan view of the container per se, shown in Fig. 7.

Fig. 9 is a view similar to Fig. 2, but illustrating a modified form of the device.

Fig. 10 is a fragmentary horizontal sectional view taken on the line 10—10 of Fig. 9.

The can cover remover consists of a prying member 12 movably mounted upon the outer side of a container 13 having a cover 14 and positioned with a portion 15 extended beneath an edge 16 of the cover 14 and adapted upon being manually moved to pry the cover off from the container. The word container as used in this specification may be a can, or other similar object.

In Figs. 1 to 4, the container has been shown with a rolled top edge 17 housing a wire 18. A portion 19 of this wire extends within the rolled edge 17. The prying member 12 is pivotally mounted on the extended portion 19 of the wire. The rim of the cover 14 snugly engages upon the top edge of the container at all points except in the vicinity of the prying member 12, and in this vicinity is bulged as indicated by reference numeral 16' so that the top portion 15 of the prying member may engage therebeneath.

When the cover is in its closed position the prying member 12 is vertical as shown in Fig. 2. The lower end may be manually gripped for moving the prying member to a horizontal position as shown in Fig. 3, and an intermediate portion of the prying member engages the lower edge of the rim of the cover 14 for prying the cover off of the container. The said prying member 12 consists of a piece of wire bent at its central portion so as to provide two loops 20 constituting a journal portion for engaging upon the wire portion 19, and is twisted together at the ends 21.

In the form illustrated in Figs. 5 to 8, a container 22 has been illustrated formed with an outwardly bent top edge 23 and with a small depressed portion 24 near said top edge. This container is provided with a cover 25 uniformly straight along all sides and snugly engaging the top edge 23 when in place. The rim of the cover 25 forms a cavity 26 with the depressed portion 24. A prying member 27 is pivotally mounted upon the depressed portion 24 so that its top end extends beneath the rim of the cover 25. The prying member 27 consists of a stem portion enlarged at its top end 28. A spindle 29 passes thru the enlarged portion 28 and is attached by lugs 30 upon the container 22 within the depressed portion 24. The operation of this form of the invention is similar to the previous described form.

In Figs. 9 and 10, a modified form of the invention has been disclosed in which a prying member 31 is movably mounted upon the outer side of the container 13 having a cover 14 and is adapted to be positioned with its top portion extended beneath an edge of the cover to any desired adjusted position, and is adapted upon being manually moved to pry the cover off of the container. The adjustment of the prying member is accomplished by a guide bracket 32 with a vertical row of apertures 33 attached upon the side of the container. A slide 34 is engaged within the guide bracket and is provided with an aperture 35 alignable with any one of the apertures 33.

The prying member 31 is pivotally mounted at its top end upon the slide 34. Normally the prying member is in the vertical position as shown in Fig. 9. The apertures 33 and 35 are arranged slightly to one side of the prying member 31 so that a nail or other pointed tool may be engaged thru the aperture 35 and thru one of the apertures 33 for holding the slide 34 in any vertical adjusted position. During the initial stages of prying the cover off, the slide 34 is in a somewhat lowered position.

The prying member 31 is manually raised for slightly prying the cover off. Then the prying member 31 is again moved to its vertical position and the slide 34 elevated for further extending beneath the edge of the cover. The prying member is next moved to its horizontal position and this is continued until the cover is pried off. This arrangement is adapted for prying off covers which are exceptionally hard to get off since the leverage is much greater than in the forms previously described.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A can cover remover, comprising a prying member movably mounted upon the outer side of a container having a cover and positioned with a portion extended beneath an edge of the cover and adapted upon being manually moved to pry the cover off from the container, and means for adjusting the amount of extension of the prying member beneath the edge of the cover.

2. A can cover remover, comprising a prying member movably mounted upon the outer side of a container having a cover and positioned with a portion extended beneath an edge of the cover and adapted upon being manually moved to pry the cover off from the container, and means for adjusting the amount of extension of the prying member beneath the edge of the cover, said means including a slide pivotally supporting the prying member and mounted upon a guide bracket fixed upon the container.

3. A can cover remover, comprising a prying member movably mounted upon the outer side of a container having a cover and positioned with a portion extended beneath an edge of the cover and adapted upon being manually moved to pry the cover off from the container, and means for adjusting the amount of extension of the prying member beneath the edge of the cover, comprising a guide bracket formed with a vertical row of apertures and attached upon the side of the container, and a slide formed with a similar vertical row of apertures and slidably engaged within the said guide bracket, said prying member pivotally mounted upon said slide.

4. A can cover remover, comprising a prying member movably mounted upon the outer side of a container having a cover and positioned with a portion extended beneath an edge of the cover and adapted upon being manually moved to pry the cover off from the container, and means for adjusting the amount of extension of the prying member beneath the edge of the cover, comprising a guide bracket formed with a vertical row of apertures and attached upon the side of the container, and a slide formed with a similar vertical row of apertures and slidably engaged within the said guide bracket, said prying member pivotally mounted upon said slide, and said apertures of the slide and the guide are formed to one side of the prying member and are alignable so that a pointed tool may be engaged through the apertures for holding the slide in vertical adjusted positions.

In testimony whereof I have affixed my signature.

EVA McCUTCHEON.